Nov. 23, 1943.   R. B. P. CRAWFORD   2,334,865
AIR CONDITIONING SYSTEM
Filed July 21, 1939   4 Sheets-Sheet 1

Inventor
Robert B. P. Crawford
By
George H. Fisher
Attorney

Fig.2

Inventor
Robert B.P. Crawford
By
George H Fisher
Attorney

Nov. 23, 1943.  R. B. P. CRAWFORD  2,334,865
AIR CONDITIONING SYSTEM
Filed July 21, 1939    4 Sheets-Sheet 4

Fig. 7

Inventor
Robert B. P. Crawford
By George H. Fisher
Attorney

Patented Nov. 23, 1943

2,334,865

UNITED STATES PATENT OFFICE 2,334,865

AIR CONDITIONING SYSTEM

Robert B. P. Crawford, Miami, Fla.

Application July 21, 1939, Serial No. 285,736

12 Claims. (Cl. 257—3)

This invention relates to an air conditioning system and while it has been shown and described with particular reference to the conditioning of an egg incubator, it should be understood that many of the features thereof are of utility in the conditioning of structures in general.

In the hatching of eggs, the number of chicks that are hatched for a given number of fertile eggs depends upon the maintenance of proper conditions of temperature and humidity during the various stages of incubation. Thus, during the early stages of incubation, it may be necessary to supply heat to the eggs to maintain them at the proper temperature of approximately 100° F. During the latter stages of incubation, the eggs generate a large amount of heat and it may be necessary to cool these stages to maintain the temperature thereof at the proper value. In accordance with the teachings of my invention, the eggs are carried through the incubator by means of a belt which requires approximately twenty-one days for the eggs to move from one end of the incubator to the other. The incubator may be divided into several stages, as for example seven stages in each of which the eggs remain for three days. Suitable heat exchanger coils are provided in the walls of each stage, and through these coils water or other suitable heat exchanging fluid is circulated, the water absorbing heat from the latter stages and giving this heat up to the earlier stages, the flow of water through the various stages being controlled by means of thermostats located in each stage in the more specific embodiment of my invention.

Under many conditions it may be necessary to additionally heat or cool the water, and for this purpose a refrigeration system is provided, the evaporator thereof providing the necessary cooling and the condenser thereof providing the necessary heating. By reason of the fact that the heat generated in the latter stages is used to provide heat in the early stages, the necessary additional heating or cooling may be effected by the provision of a refrigeration system of relatively small capacity.

Another factor in increasing the yield of chicks from a given number of fertile eggs is in maintaining the air in the incubator in a condition of purity. This is generally done by circulating fresh air through the incubator, but previous practice has required the circulation of a large volume of air through the incubator, since the air also served to maintain desired temperatures in various portions thereof. It has also been the practice to recirculate a large amount of the air to reduce the operating expense of the systems. The circulation of the air has resulted in the spreading of germs from egg to egg, and chemicals used to reduce the germ concentration of the air have resulted in the killing of a number of embryo chicks. In accordance with my invention, since most of the heating and cooling is effected by the use of the coils aforementioned, the circulation of air to effect the heating and cooling is unnecessary, and only sufficient air need be circulated to maintain the humidity at the proper value and to maintain the air in a clean condition and to remove the excess $CO_2$ and $H_2O$ vapor formed during the incubating process. The air is passed over the heat exchanger coils and upwardly through the conveyor belt and is exhausted through the upper portion of the casing. The conveyor belt is so constructed that the air passing over one egg is unable to contact any other egg, and thus the spreading of germs from egg to egg is minimized.

Provision is also made for testing the eggs passing through the incubator and ejecting the sterile eggs before they have been in the incubator for too long a period of time so that the eggs may be used for a useful purpose, such as the manufacture of egg powder. Provision is also made for cleaning and sterilizing the belt as it leaves the incubator, so that as the belt enters the incubator and eggs are delivered thereto, it will be free of dirt and germs.

In addition to the features enumerated above, means for accurately controlling the humidity in the incubator are employed. Also, the excess sensible and latent heat removed by the air leaving the incubator may be imparted to the air entering the incubator, thus increasing the operating efficiency of the system, and permitting fresh air only to enter the incubator, without increasing to any appreciable extent the operating expense thereof.

It is accordingly an object of my invention to provide an egg incubator embodying the various features outlined above and other novel features set forth in the accompanying specification and claims.

It is also an object of my invention to provide a novel system of air conditioning applicable to structures in general and not limited to the conditioning of egg incubators.

Another object of my invention is the provision of a novel control arrangement for an air conditioning system.

Other objects and advantages will become apparent upon a study of the specification and claims and the appended drawings, wherein like reference characters indicate like parts in the various views and wherein.

Figure 1:
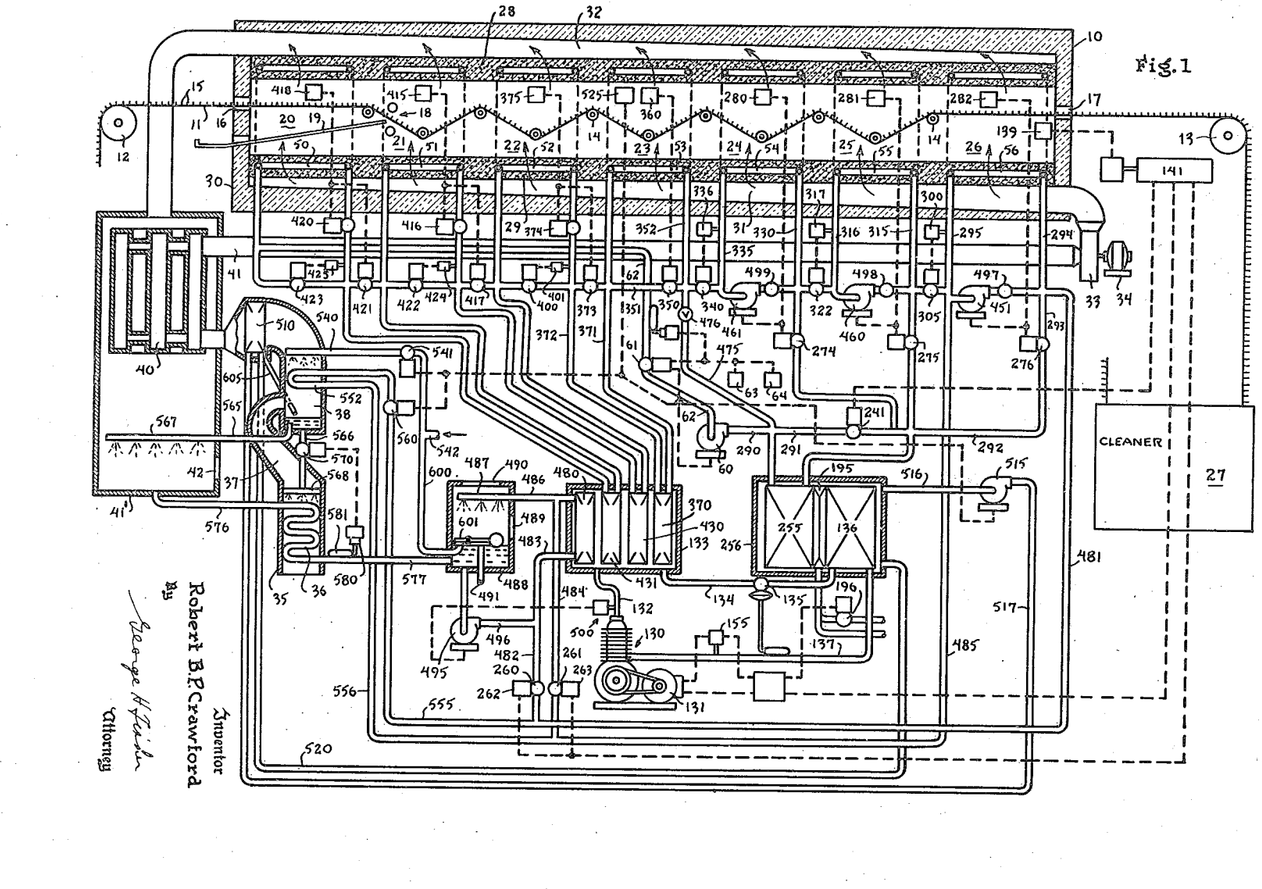
Figure 1 is a view with certain parts shown in cross section of one form of conditioning system embodying my invention.

Referring more particularly to Figure 1 of the drawings, the reference character 10 represents an egg incubator to which the conditioning system embodying my invention is to be applied. A belt 11 travelling over pulleys 12 and 13 carries the eggs through the incubator. Suitable guide pulleys 14 are located within the incubator to guide the belt therethrough and these pulleys are alternately arranged at different levels within the incubator for causing the belt to travel up and down on its course therethrough so that the eggs carried thereby may be turned at frequent intervals. The belt carries suitable spacing elements 15 so that each egg carried thereby is in a separate compartment on the belt and the belt is formed of suitable porous material to permit upward circulation of air through the belt and past the eggs carried thereby. Since the circulation of air is upward through the belt and incubator, the spacing elements carried by the belt and separating the various eggs prevent any portion of the air from contacting more than one egg so as to prevent or minimize the spreading of germs from one egg to another, and by reason of this and the accurate control of the temperature and humidity throughout the incubator, the mortality of the eggs is minimized. Suitable means to be later described in detail are provided for determining sterilization of eggs, and releasing sterile eggs from the belt, the eggs leaving the incubator by way of the runway 19 in a manner to be later set forth.

The travel of the belt through the incubator is of such speed that it requires approximately twenty-one days for an egg to travel from the entrance 16 of the incubator to the exit 17. The incubator for purposes of illustration is shown as being divided into seven stages 20, 21, 22, 23, 24, 25, and 26, in each of which stages the eggs remain for a period of approximately three days. Suitable means well known in the art may be provided for loading the eggs on the belt 15, and removing the chicks from the belt as they leave the incubator. Suitable means 27 may also be provided for scrubbing and disinfecting the belt after it leaves the incubator, one preferred construction of such means being more fully disclosed hereinafter.

The interior walls of the incubating chamber, as illustrated by the reference characters 28 and 29, may be formed of suitable porous material which permits air to flow readily therethrough. The outer walls 30 of the incubator may be formed of any suitable heat insulating material and these walls are spaced from the inner walls by means of the passages 31 and 32. A fan 33 driven by a motor 34 causes air to flow by means of the passageway 31 through the lower wall 29 of the incubator and the air passes upwardly through the belt 11 and past the eggs carried thereby, through the upper wall 28 and leaves the incubator by means of the passageway 32 separating the wall 28 and the upper outer wall of the incubator. Passages 31 and 32 may be tapered as shown so as to equalize the flow of air through the incubator at various distances from the fan. The air passes to the fan 33 by means of the chamber 35 carrying a heat exchanger coil 36, a passageway 37 which connects the chamber 35 with a second chamber 38 carrying suitable humidifying and dehumidifying means to be later described, the heat exchanger 40 and the passageway 41 to the fan inlet. The air leaving the incubator by way of the passageway 32 passes downwardly through the chamber 41' past the heat exchanger 40 whereby the air passing to the fan passes in heat exchange relationship with the air leaving the incubator by way of the chamber 20 and the exit 42.

Embedded within the porous walls 28 and 29 are the heating and cooling coils. During the early stages of incubation, assuming the room wherein the incubator is located is at 70° F., the eggs in stages 20, 21, and 22 will need to be heated, neither heating nor cooling may be required of the eggs in stage 23, but since the eggs generate a considerable amount of heat during the latter stages of incubation, cooling may be required of the eggs in stages 24, 25, and 26. Accordingly stages 20, 21 and 22 have their walls provided with heating coils 50, 51, and 52, the stage 23 may have its walls provided with cooling coils 53 since at certain times this stage may require a certain amount of cooling and stages 24, 25, and 26 have their walls provided with the cooling coils 54, 55, and 56. These various coils will be provided in the upper and lower walls of the chamber and may also be embedded in the side walls thereof and are provided to take care of the heat to maintain the eggs in the early stages of incubation up to the proper temperature and also take care of the cooling to keep the eggs in the latter stages down to the proper temperature and thus eliminate heating or cooling through the shell of the incubator or from the surroundings. The circulation of air through the incubator is not for the purpose of heating or cooling the eggs to any extent but is for the purpose of maintaining the air within the incubator in a state of purity and at the proper relative humidity.

Water is supplied to the various coils 50 to 56 under the control of suitable valves and pumps to be hereinafter described, the main flow of water being effected by means of a pump 60. The rate at which water is circulated by the pump 60 is controlled in accordance with the temperature of the water passing to this pump by controlling the position of a valve 61 located in the inlet pipe 62 to the pump 60. A room thermostat 63 is provided for adjusting the temperature at which the water passing to the pump 60 is maintained and a second controller 64 which may be either manually or automatically operated in any suitable manner also adjusts the temperature at which the water is to be maintained in accordance with the number of eggs passing through the incubator.

Figure 2:
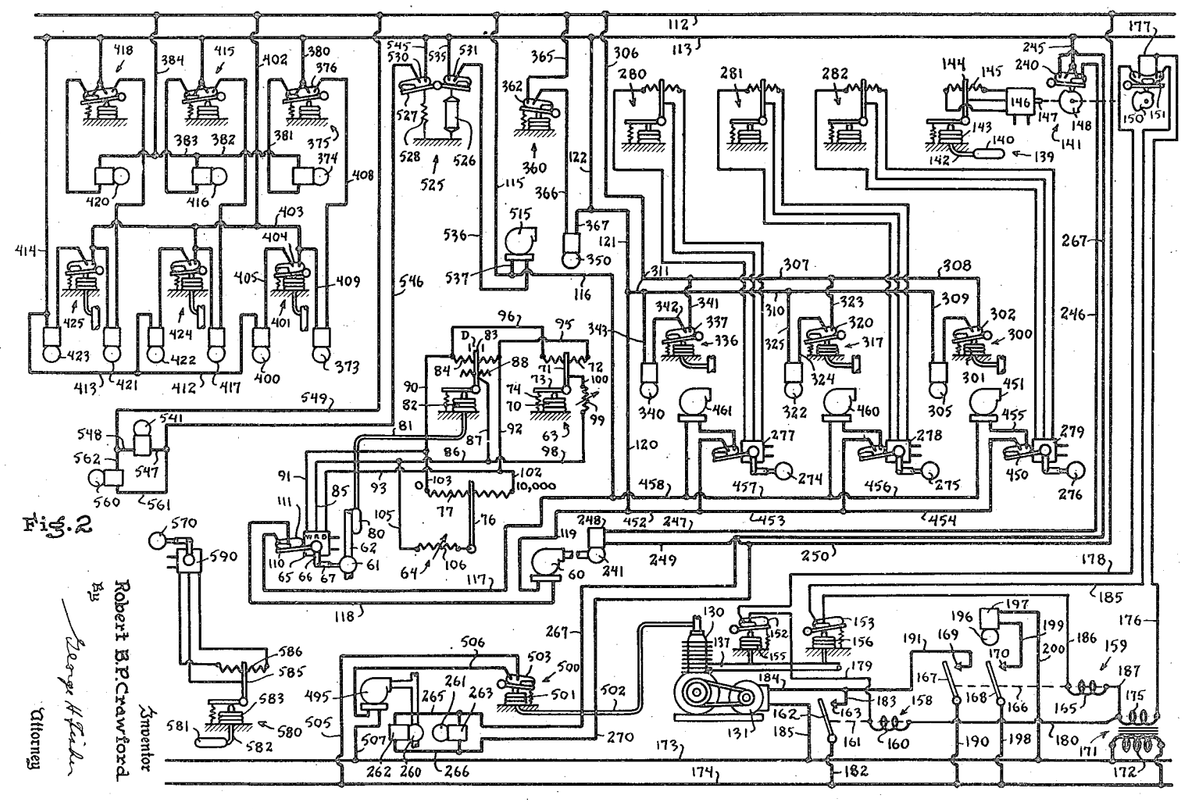
Figure 2 is a wiring diagram of the control system of Figure 1.

Referring now to Figure 2 the circuits for controlling the valve 61 are shown in detail. The valve 61 is operated by a proportioning motor of the type illustrated in Patent 2,028,110 issued to D. G. Taylor January 14, 1936. This motor may be connected to the valve by means of the arm 66 operated by the motor and the link 67 connecting the arm 66 to the stem of valve 61. The thermostat 63 is shown to comprise a bellows 70 provided with a suitable volatile fill which causes the bellows to expand or contract in accordance with variations in temperature in the space in which the bellows is mounted. The bellows controls the position of a slider arm 71 which cooperates with a potentiometer resistance 72, the arm 71 being connected to an arm 73 biased into engagement with the bellows by the spring 74. The controller 64 is shown to comprise a manually operated slider arm 76 which cooperates with the resistance 77 which may have suitable indicia thereon to correspond to the number of eggs within the incubator. As stated above, this arm may be manually adjusted in accordance with the number of eggs in the incubator or automatically controlled in any suitable manner. Mounted in engagement with the inlet pipe 62 which conveys the water to the pump 60 is a bulb 80 connected by the capillary tube 81 to the bellows 82, this tube, bulb, and bellows being provided with a suitable volatile fill and the bellows 82 controlling the position of the slider arm 83 which cooperates with the potentiometer resistance 84. Upon an increase in the temperature of the water in the pipe 62 the slider arm 83 moves to the right and as the temperature decreases the slider arm will move toward the left. The R terminal of the motor 65 is connected to the slider arm 83 by means of conductors 85, 86, 87 and the center tapped resistance 88. The left side of the resistance 84 is connected to the W terminal of the motor 65 by means of conductors 90 and 91 whereas the opposite extremity of resistance 84 is connected to the B terminal of the motor 65 by means of conductors 92 and 93. As the temperature of the water in the pipe 62 decreases the arm 83 will move toward the left thus decreasing the resistance between the R and W terminals of the motor 65 and thus causing the motor to move the valve towards closed position and decreasing the supply of water to the pump 60. Conversely as the temperature of the water increases the resistance between the R and B terminals of the motor will decrease and the valve 61 will be moved towards open position.

The right end of resistance 72 of the thermostat 63 is connected to the B terminal of the motor by means of conductors 93, 92, and 95 whereas the opposite end of this resistance is connected to the W terminal by means of conductors 91, 90, and 96. The slider arm 71 is connected to the R terminal by means of conductors 85, 86, 98, variable resistance 99, and conductor 100. The provision of the resistance 99 in the circuit to the slider arm 71 renders this control arm less sensitive than the control arm 83 and the effect of a movement of the arm 71 in response to a variation in the space temperature is to shift the control range of the arm 83. In other words, a movement of the arm 83 through a distance D has as much effect on the valve 61 as the movement of arm 71 throughout the total extent of its range. As the space temperature increases and arm 71 moves toward the right, the control range D of the arm 82 is moved toward the left and this causes the valve 61 to operate to maintain a lower water temperature. The provision of the center tapped resistance 88 insures that the length of the control range D of the control arm 83 will be the same length regardless of the position of the control range as adjusted by the thermostat 63 as well as the potentiometer 76, 77.

The right end of resistance 77 is connected by means of conductors 93 and 102 to the B terminal of the motor whereas the opposite end of this resistance is connected by conductors 91 and 103 to the W terminal of the motor. The R terminal of the motor is connected to the control arm 76 by means of conductors 85, 105, and variable resistance 106 which renders this control arm less sensitive than the control arm 83 and a change in the position of this control arm 76 acts to shift the range of the arm 83. Thus as arm 76 is shifted toward the right in response to an increase in the number of eggs in the incubator, the control range of the arm 83 will be shifted towards the left and valve 61 will operate to regulate the flow of water to maintain the temperature of the water entering the pump 60 at a lower value.

It will now be apparent that the pump 60 will cause a circulation of varying amounts of water in a manner to maintain the temperature of the water passing to the pump at a desired value and which value is decreased as the temperature of the space in which the incubator is located is increased or as the number of eggs in the incubator increases, and this water temperature will increase as the space temperature decreases or the number of eggs in the incubator decreases. The effectiveness of the control arms 71 and 76 may be readily varied by adjusting the variable resistances 99 and 106.

The motor 65 also operates an arm 110 carrying a mercury switch 111 which is in the circuit to the pump 60 and causes this pump to stop should the valve 61 move to a substantially closed position where heat transfer would be ineffective. Line wires 112 and 113 connected to a suitable source of power (not shown) are provided for supplying power to the pump 60 and to many of the other control devices as will be understood. When the mercury switch 111 is in circuit closing position power is supplied to the pump 60 by way of the following circuit: from the line wire 112 through conductors 115, 116, 117, switch 111, conductor 118, pump 60, conductors 119, 120, 121, and 122 to the line wire 113. When the valve 61 has been moved to closed or substantially closed position the switch 111 will be tilted to open position and the above described circuit to the pump 60 will be interrupted and the pump will stop operating.

The cooling and heating of the water used in the system is effected by a refrigeration system which is shown to comprise a compressor 130 driven by a motor 131, the compressor being connected by a pipe 132 to a condenser 133 from which refrigerant flows by way of pipe 134 and expansion valve 135, which is illustrated as a conventional type of thermostatic expansion valve, to the evaporator 136, the refrigerant returning by way of the pipe 137 to the inlet of the compressor 130. The condenser 133 is utilized for supplying the necessary heat to the water used for heating and humidifying purposes and the evaporator 136 is utilized for cooling the water for cooling and dehumidifying purposes. Referring again to Figure 2 the control system for the operation of the compressor 130 is illustrated in detail. Located near the exit of the incubator is a thermostat 139 which operates a step controller generally designated at 141. The thermostat 139 is shown to comprise a bulb 140 connected by the capillary tube 142 to the bellows 143, these elements being provided with a suitable volatile fill and the bellows controls the position of the slider arm 144 which cooperates with resistance 145 for controlling the position of the proportioning motor 146. The shaft 147 of motor 146 controls the position of a cam 148 for a purpose to be later described and a second cam 150 controlling the position of a mercury switch 151 which controls the compressor operation in cooperation with switches 152 and 153 which respond to the pressure on the suction side of the compressor.

The position of the switch 152 is controlled by the bellows 155 which is in communication with the pipe 137 leading to the suction side of the compressor and the position of the switch 153 is controlled by the bellows 156 which is also in communication with the pipe 137. The switch 152 is arranged to be moved to circuit breaking position when the suction pressure falls below 60 lbs. for example whereas the switch 153 remains closed until the suction pressure falls to some lower value such as 32 lbs. For controlling the operation of the compressor motor 131, relays 158 and 159 are provided, energization of either relay causing operation of the compressor motor as will become apparent. The relay 158 comprises a relay coil 160, an armature 161, and a switch arm 162 cooperating with a fixed contact 163. When the relay coil 160 is energized, the arm 162 is moved into engagement with the contact 163, and when the coil is deenergized the arm moves out of engagement with the contact under the influence of gravity or any suitable biasing means (not shown). The relay 159 comprises the relay coil 165, armature 166 and switch arms 167 and 168 cooperating with the fixed contacts 169 and 170. These arms are arranged to engage their respective contacts when the relay is energized and to move out of engagement therewith upon deenergization of the relay. Power is supplied to these relays by means of a step-down transformer 171 which transformer includes a high tension primary 172 connected across the line wires 173 and 174 leading to a suitable source of power (not shown), the transformer also including a low tension secondary 175.

The cam 150 controlled by the step controller 141 in response to variations in temperature in the space moves in a clockwise direction upon a rise in temperature and if the temperature in the incubator rises to 98° F. at the location of the bulb 140, the cam moves the mercury switch 151 into a position wherein the contacts at the left end of the switch are closed by the mercury element. If the suction pressure on the compressor is at 60 lbs. or above, the relay 158 will be energized at this time by means of the following circuit: from one side of the transformer secondary 175 through conductors 176, 177, the contacts at the left end of the mercury switch 151, conductor 178, switch 152, conductor 179, relay coil 160 and conductor 180 to the other side of the secondary 175. Energization of the relay 158 causes switch arm 162 to move into engagement with contact 163 thus causing energization of the compressor motor 131 by means of the following circuit: from the line wire 174 through conductor 182, switch arm 162, contact 163, conductors 183, 184, motor 131, and conductor 185 to the line wire 173. The compressor will now be placed into operation and will continue operating as long as the temperature at the bulb 140 is above 98°, until the suction pressure on the compressor drops below a predetermined value such as 60 lbs.

Should the temperature in the incubator at the bulb 140 now drop below 98° the cam 150 will be rotated counterclockwise and the mercury switch 151 will move back to the position shown. If the temperature in the incubator adjacent the exit thereof at the bulb 140 drops to a still lower value such as 95° F. which will normally happen only when there are very few or no eggs in the latter stages of the incubator, the cam 150 will be rotated counter-clockwise still further until the mercury switch 151 is tilted to a position wherein the contacts at the right end thereof are bridged by the mercury element. The suction pressure at this time on the compressor will normally be relatively high so that the switch 153 which moves in response to suction pressure will be in closed position. A circuit will now be established to the relay coil 165 as follows: from one side of the transformer secondary 175 through conductor 176, the contacts at the right end of the mercury switch 151, conductor 185, mercury switch 153, conductor 186, relay coil 165, and conductor 187 to the other side of the secondary 175. Energization of the relay 159 will cause switch arm 167 to move into engagement with the contact 169, thus establishing the following circuit to the compressor motor 131: from line wire 174 through conductor 190, switch arm 167, contact 169, conductors 191, 184, motor 131 and conductor 185 to the line wire 173. The compressor will now start operating and will continue to operate until the suction pressure drops to a predetermined low value such as 32 lbs. whereupon the mercury switch 153 will be moved to circuit breaking position and the compressor will shut down. The switch 153 may be arranged with a relatively wide differential by any suitable means well known in the art so that it will not move back to circuit making position until the suction pressure has risen to some value such as 50 lbs. After the suction pressure has risen to this value and the switch 153 has moved back to this position the compressor will again operate until the suction pressure drops below the predetermined low value of 32 lbs. for example. This operation of the compressor will continue in this manner as long as the temperature at the bulb 140 remains below 95° F.

The tank 256, Figure 1, in which is mounted the evaporator 136 surrounded by a heat exchange medium such as water, is provided with a coil 195 in suitable heat exchange relationship with the evaporator coil 136 and heating fluid is arranged to be circulated through this coil whenever the relay 159 is energized, the flow of heating medium through this coil being under the control of a valve 196. Any suitable means such as a solenoid 197 may be provided for controlling the valve 196, energization of the solenoid moving the valve to open position, the valve moving to closed position when the solenoid is deenergized under the influence of gravity or any suitable biasing means (not shown). When the relay 159 is energized, switch arm 168 is moved into engagement with contact 170 thus energizing the solenoid 197 by means of the following circuit:

from the line wire 174 through conductor 198, switch arm 168, contact 170, conductor 199, solenoid 197, and conductor 200 to the line wire 173.

It will now be seen that whenever the compressor motor 131 is placed in operation by reason of a low temperature at the controller 139, the valve 196 is simultaneously opened thus permitting the flow of heating medium through the heat exchanger coil 196 and thereby heating the evaporator 136. Since the solenoid 197 is controlled by the relay 159 this valve will remain closed whenever the relay 159 is deenergized so that when the compressor is in operation by reason of the temperature at the controller 139 being above 98° F. no heating medium will be supplied to the coil 195. The purpose of this arrangement will become apparent as the description proceeds.

The cam 148 of the step controller 141 controls the position of a mercury switch 240 which is shown as being a double ended switch and in the position illustrated, the contacts at the right end thereof are closed. In this position of the switch the valve 241 which is located in the pipe connected to the outlet of the pump 60 will be energized through the following circuit: from the line wire 113 through conductor 245, the contacts at the right end of switch 240, conductors 246, 247, valve motor 248, conductors 249 and 250 to the line wire 112. The energization of the valve motor 248 which may be in the form of a solenoid or any other suitable form of motor causes valve 241 to move to open position. As the temperature in the incubator increases cam 148 will rotate in a clockwise direction and when the temperature has risen sufficiently the cam will move the switch to its opposite position wherein the above described circuit to the valve motor 248 is interrupted and this valve 241 will close under the influence of gravity or any suitable biasing means. As shown in Figure 1 this valve is located in a by-pass around the cooling coil 255 in the tank 256 housing the evaporator and which coil is arranged to be cooled by the evaporator coil 136. It will be understood that resort may be had to any suitable arrangement for securing a sufficient heat exchange relationship between the evaporator coil 136 and the coil 255 and as illustrated, the heat exchange medium in the tank 256 surrounding the evaporator 136 serves this purpose. When the valve 241 is closed water may circulate from the pump through the cooling coil 255 and be cooled thereby but when the valve 241 is opened the water may by-pass this cooling coil and not be cooled appreciably thereby. The mercury switch 240 also controls the position of a pair of valves 260 and 261 for a purpose to be later set forth. These valves are shown as being operated by motors 262 and 263, respectively. With the mercury switch in the position wherein the contacts at the left end thereof are closed, these valve motors which are connected in parallel by conductors 265 and 266 are energized as follows: from the line wire 113 through conductor 245, switch 240, conductor 267, valve motors 261 and 262, and conductors 270 and 250 to the line wire 112.

The flow of cooling water into the coils 54, 55, and 56 is controlled primarily by the valves 274, 275, and 276, respectively, the position of these valves being controlled by the proportioning motors 277, 278, and 279, respectively. Thermostats 280, 281, and 282 located in the stages 24, 25, and 26, respectively, control the positions of the motors 277, 278, and 279, respectively, these thermostats comprising bellows, slider arms and potentiometer resistances similar to the thermostat 140 described above. Should there be a need for cooling in the last stage 26 of the incubator, the thermostat 282 will cause the valve motor 279 to move the valve 276 to open position, the opening of the valve depending upon the rise in temperature in this stage above the desired value. Water will now be permitted to circulate through the coil 56 by the pump 60 by way of pipes 290, 291, 292, 293, and 294, the water leaving this coil 56 by way of pipe 295. Connected to the pipe 295 is a pressure responsive device 300 which includes a bellows 301 controlling the position of a mercury switch 302. As the pressure in the pipe 295 increases due to the flow of water through the coil 56 the pressure controller 300 will move the mercury switch 302 to closed position and in this position the motor controlling the valve 305 will be energized by way of the following circuit: from line wire 112 through conductors 306, 307, 308, switch 302, the motor of valve 305, conductors 309, 310, 311, 121, and 122 to the line wire 113. Accordingly the valve 305 will now open and permit the water to flow through this valve and into the coil 55 by way of the pipe 315, the water leaving the coil by way of the pipe 316 in which is connected a pressure controller 317 similar to the pressure controller 300 in the pipe 295. This pressure controller will now move the mercury switch 320 controlled thereby to closed position and close a circuit to the motor of the valve 322 which circuit is as follows: from the line wire 112 through conductors 306, 307, 323, switch 320, conductor 324, the motor of valve 322, conductors 325, 310, 311, 121, and 122 to the line wire 113. The water now flows through the valve 322 and by way of the pipe 330 into the coil 54 and leaves the coil by way of the pipe 335 to which is connected a pressure controller 336 which controls the position of the mercury switch 337 and closes upon flow of water through the pipe 335 to cause the opening of the valve 340 by way of the following circuit: from the line wire 112 through conductors 306, 341, switch 337, conductor 342, the motor of valve 340, conductors 343, 311, 121, and 122 to the line wire 113. It will accordingly be seen that upon a call for cooling in the last stage of the incubator valve 276 is opened and water flows through the coil 56, causes the opening of valve 305 by the pressure controller 300 whereupon it flows through the coil 55 causing the opening of the valve 322 by the pressure controller 317 whence it flows through coil 54 and causes valve 240 to open by means of the pressure controller 336.

The water can now flow either through the coil 53 of the stage 23 by way of the pipe 352 or may by-pass this coil by way of the pipe 351 if the valve 350 in this latter pipe should be opened. This valve is controlled by the thermostat 360 responsive to the temperature in the stage 23 and the motor controlling the position of this valve 350 will be energized whenever the temperature in the stage 23 drops to a predetermined value, thus causing the closing of the mercury switch 362 controlled thereby. When this switch closes the motorized valve 350 is energized as follows: from the line wire 112 through conductor 365, mercury switch 362, conductor 366, valve 350, and conductors 367 and 122 to the line wire 113. Thus whenever there is no need for cooling in the stage 23 the valve 350 is open and water by-passes the coil 53 by way of the pipe 351. Should the temperature in the stage 23 however be too high then the valve 350 will be closed and all of the water must circulate through the coil 53 in the stage 23. Generally, when it is necessary to do cooling in the stage 26 it will also be necessary to do some cooling in the stages 24 and 25 and consequently the flow of water from coil 56 through coils 55 and 54 will be desirable.

The water leaving the coil 53 or by-passed around it may flow through the coil 370 in the condenser 133 by way of the pipes 371 and 372 or may by-pass this coil should the valve 373 be in open position. This valve as well as the valve 374 is controlled by the thermostat 375 located in the stage 22. The thermostat 375 controls a double ended mercury switch 376 and when the temperature in the stage 22 is sufficiently low a circuit to the valve 374 will be energized as follows: from the line wire 113 through conductor 380, the terminals in the left end of switch 376, conductor 381, valve 374, conductors 382, 383, and 384 to the line wire 112. This valve accordingly will permit fluid to flow to the coil 52. The valve 373 in the by-pass around the coil 370 however will be de-energized and will prevent flow of water through this by-pass. Accordingly the water leaving the stage 23 or flowing around this stage will flow through the coil 370 in the condenser 133 where it will be heated thereby and will then flow by way of pipe 372 and valve 374 through the coil 52. At this time the valve 400 in the by-pass around the coil 52 will be closed since the circuit thereto will be interrupted at the pressure controller 401. However, should the temperature in the stage 22 be sufficiently high the valve 373 will be energized as follows: from the line wire 113 through conductor 380, the right hand terminals of mercury switch 376, conductor 408, motor of valve 373, conductors 409, 403, and 402 to the line wire 112. At the same time the circuit through the valve 374 is interrupted by the mercury switch 376 and this valve will move to closed position. Pressure will now build up in the pipe 372 and the pressure controller 401 will tilt the mercury switch 404 to closed position and close a circuit through the valve 400 as follows: from the line wire 112 through conductors 402, 403, switch 404, conductor 405, valve 400, conductors 412, 413, and 414 to the line wire 113. Accordingly the water is permitted to by-pass the coil 52 in the stage 22. The same mode of operation will take place in the stages 21 and 20, the thermostat 415 in stage 21 controlling the valves 416 and 417 and the thermostat 418 in the stage 20 controlling the valves 420 and 421. Likewise the valves 422 and 423 in the by-passes around the coils 50 and 51 will be controlled by the pressure controllers 424 and 425, respectively. The coils 50 and 51 will receive fluid from the coils 431 and 430, respectively, in the condenser 133 should the valves 421 and 417 be closed, respectively, due to the temperature in the respective stages being at too low a value.

It will accordingly be seen that in the first three stages of the incubator, namely, stages 20, 21, and 22 heating fluid will be supplied to the coils 50, 51, and 52, respectively, by way of the coils 370, 430, and 431 in the condenser 133. Whenever the temperature in any one of these stages rises to the desired value the heating fluid will by-pass the stage and will also by-pass the respective coil in the condenser 133. The water flows back to the pump 60 by way of the pipe 62, under the control of valve 61, the operation of which has been heretofore completely described.

Referring back now to the stages 23, 24, 25, and 26 which will at times require cooling, it has been stated that thermostat 282 controls the position of the motor 279 which controls the position of the valve 276 in accordance with the temperature in the stage 26. In a similar manner the valves 275 and 274 control the direct supply of water from the pump 60 through the stages 25 and 24 in accordance with the temperature in those stages. The motor 279 which controls the position of valve 276 also controls the position of a mercury switch 450 which controls the energization of a pump 451. Should the temperature in the stage 26 become excessively high and valve 276 moved to wide open position, the switch 450 controlled by the motor 279 will move to closed position and energize the pump 451 by way of the following circuit: from the line wire 113 through conductors 122, 121, 120, 452, 453, 454, switch 450, conductor 455, pump 451, conductors 456, 457, 458, 116, and 115 to the line wire 112. The pump 451 will now be energized and will cause an increase in the flow of cooling water through the cooling coil 56 which will assist in maintaining the temperature in this stage at the desired value. Pumps 460 and 461 are provided for similarly increasing the flow of water through the coils of stages 25 and 24. As the temperature in these stages becomes high, it will now be seen that the valves 274, 275, and 276 will be controlled in accordance with the temperatures in the spaces 280, 281, and 282 and whenever the temperature in any one of these stages becomes excessively high, or whenever the valves are moved to wide open positions, the pumps associated with the respective stages will be placed in operation to increase the circulation of water through the cooling coils of the respective stages to assist in reducing the temperature thereof to the desired value. Check valves 497, 498, and 499 are provided in the pipes connected to the outlets from pumps 451, 460 and 461, respectively, to prevent back flow through the pumps when they are not in operation.

There may be times when it is necessary to effect heating in the stages 20, 21, and 22 while no cooling is required in the stages 24, 25, and 26. If no cooling is required in these latter stages the valves 274, 275, and 276 will be closed and accordingly a pipe 475 is provided between the discharge side of the pump 60 and the pipe 351, and this pipe 475 is provided with a pressure relief valve 476. If the valves 274, 275, and 276 are all closed, the pressure built up in the pipe 475 by the pump 60 will cause the valve 476 to open and will permit a circulation of water through that portion of the system which supplies water to the coils 50, 51, 52, and 53. If any one of theses stages should be calling for a circulation of water through the coils thereof, the valves associated with those stages will be operated in the manner described above to permit this circulation of water. If cooling should be required in the stages 24, 25, or 26 at a time when no heat is required in the first stages of the incubator, the valves associated with these first stages will permit the water to by-pass the coils therein while at the same time the water is able to flow through the coils associated with the latter stages of the incubator.

It may sometimes happen that the temperature of the outlet end of the incubator will drop to a relatively low value, this occurring under normal circumstances only when there are relatively few or no eggs in the incubator during the latter stages of incubation such as when the incubator is being placed in operation and no eggs have reached the latter stages. At this time the compressor will be placed in operation under the control of the suction pressure controller 156 as heretofore described to maintain the suction pressure at a relatively low value but it should be sufficiently high so that freezing of water or heat exchange medium surrounding the evaporator 136 will not take place. During operation of the compressor under this condition the valve 196 is opened as heretofore described to permit the supply of heating medium to the heat exchanger coil 195 thus adding heat to the evaporator 136 and thereby imposing a cooling load thereon so that longer compressor operations will take place before the suction pressure will drop to the cut-out value and so that more heat will be given off by the condenser 133, which heat equivalent is of greater value than the heat delivered to the coil 195, and which heat, in the condenser 133, may also be at a higher temperature level, if the heating medium supplied to the coil 195 is relatively cool, such as where well water or other low temperature medium is supplied thereto. In this manner, the refrigeration system will operate even if the temperature at the outlet end of the incubator drops to a relatively low value so as to supply the necessary heat to the incubator during the early stages of incubation.

As stated above, when the valve 241 is closed due to the existence of a high temperature in the incubator, thus causing the water to flow through the coil 255 associated with the evaporator of the refrigeration system, the valves 260 and 261 will be opened by the step controller and water will be permitted to flow through the coil 480 associated with the condenser of the refrigeration system. This water will flow from the pipe 293 through pipes 481, 482, 483 into the lower part of the coil 480 and will leave the upper part of the coil through pipes 484 and 485. A branch pipe 486 supplies water from the upper part of the coil 480 to a spray 487 located in a cooling tower 488. Air may flow upwardly through this cooling tower to cool the water spray, the air entering through the inlet 489 and leaving through the outlet opening 490 in the top of the tower. This cooling tower is provided with an outlet pipe 491 for preventing the level of the water in this tower from rising above a predetermined value so that if sufficient water accumulates in the bottom of the cooling tower, it will flow out through the pipe 491. A pump 495 is also provided for drawing water from the bottom of the cooling tower and feeding this water back to the coil 480 associated with the condenser 133 by way of pipes 496 and 483 so that when this pump is in operation there will be a continuous circulation of water from the cooling tower through the coil 480, thus effecting a reduction in temperature of the condenser. When the system requires a greater amount of heating than it does of cooling by the refrigeration system, it will be undesirable to operate the pump 495 since the condenser heat will be needed for heating the coils 50, 51, and 52. However, during periods when the refrigeration system is doing a greater amount of cooling than it is of heating, the temperature of the condenser will increase and this in turn will cause an increase in the head pressure on the compressor 130.

Associated with the outlet of the compressor is a pressure responsive device 500 which comprises a bellows 501 connected to the discharge from the compressor by means of pipe 502, the bellows controlling the position of the mercury switch 503. Whenever the discharge pressure on the compressor rises sufficiently high, which will be an indication that the refrigeration system is doing an excessive amount of cooling and that it will be advantageous to cool the condenser, the switch 503 will be tilted to the circuit making position thus causing the energization of the pump 495 by means of the following circuit: from the line wire 174 through conductors 505, mercury switch 503, conductor 506, pump 495, and conductor 507 to the line wire 173. At this time therefore the pump 495 will be placed into operation and will cause a circulation of water through the coil 480 and the cooling tower 488 to thus cause cooling of the condenser by the coil 480, thereby reducing the head pressure on the compressor 130. Whenever the heating load on the system rises sufficiently however, sufficient heat will be extracted from the condenser by the coils 370, 430, and 431 so that it will be undesirable to cool the condenser by means of the coil 480 and the cooling tower 488 since all the heat of the condenser will be required for heating purposes and this increase in the heating load on the system will be reflected by a drop in the head pressure on the compressor.

In the chamber 38 is a dehumidifying coil 510 through which cooling medium may be supplied to reduce the dew-point of the air passing thereover and entering the system during times when the humidity of the supply air is excessive. This coil is supplied with cooling medium by means of a pump 515 which draws cooling medium from the tank 256 associated with the evaporator 136 by means of the pipe 516, the cooling medium then passing through the pipe 517 to the coil 510 and returning by way of the pipe 520 to the tank 256. The supply of cooling medium to the coil 510 will depend upon the operation of the pump 515 and this pump will be operated in accordance with the humidity in the incubator.

For controlling the pump 515, a humidity responsive device 525 is located within the incubator or may be located in the exhaust air duct, and this device comprises a hygroscopic element 526 which controls the position of a lever 527 in accordance with the humidity in the space. As the humidity increases, the hygroscopic element 526 will elongate and the lever 527 will be moved in a counter-clockwise direction by means of the biasing spring 528, and upon a decrease in humidity the element 526 will contract and the lever 527 will move in the opposite direction. The lever 527 carries a pair of mercury switches 530 and 531 and these switches are so arranged, as will be apparent from the drawing, that as the humidity rises to a certain value the switch 531 will be moved to closed position and as the humidity decreases to a predetermined value the switch 530 will move to closed position. When the humidity in the incubator rises sufficiently high that switch 531 is closed, a circuit is established to the pump 515 as follows: from the line wire 113 through conductor 535, switch 531, conductor 536, pump 515, and conductors 537 and 115 to the line wire 112. It will thus be seen that when the humidity in the incubator becomes sufficiently high that the pump 515 will operate to pump cooling medium through the coil 510 which will cause a reduction in the dew-point of the air entering the incubator by way of this coil.

Also located within the chamber 38 in a spray 540 which may be supplied with water under the control of the valve 541 from a supply pipe 542 when the humidity in the incubator becomes sufficiently low. When the humidity in the incubator drops sufficiently, the switch 530 will move to closed position and close a circuit through the motor controlling the position of valve 541 as follows: from the line wire 113 through conductor 545, switch 530, conductors 546, 547, valve 541, and conductors 548 and 549 to the line wire 112. Accordingly, the valve 541 will be opened and the air entering the incubator and passing by this pipe 540 will receive moisture by way of this spray and accordingly its humidity will be raised. A tempering coil 552 is located below the spray 540 so that when the air entering the incubator is in need of humidification, which will generally be at times when the outside air is at a relatively low temperature, this air may have its temperature increased by the coil 552 so that it will be able to absorb additional moisture from the spray 540, and this coil 552 receives water from the pipe 481 and the pipe 555 and the water is returned to the pipe 485 from the coil 552 by way of the pipe 556. The flow of water to the coil 552 is under the control of a valve 560 which is normally closed and opened only when the valve 541 to the spray 540 is opened indicating a need of humidification. It will be noted from an examination of Figure 2 that the valve 560 is connected to the line wires 112 and 113 through the switch 530 in parallel with the valve 541 by means of conductors 561 and 562 and it will accordingly be apparent that the valves 541 and 560 will be simultaneously opened and closed.

The bottom of the chamber 38 is provided with a sump to receive water from the spray 540 and this sump is provided with a pair of outlets 565 and 566 which lead to the spray 567 and the spray 568, respectively. The flow of water to the spray 568 which is located in the chamber 35 is controlled by a valve 570 and the spray 567 is always in communication with this sump in the chamber 38 through the pipe 565. The air leaving the incubator passes downwardly through the chamber 41' over the heat exchanger 40 as has been pointed out above, and before this air passes outwardly through the opening 42 it must pass over the spray pipe 567 which spray will be rather cold under normal conditions since the spray 540 is only operating at those times when there is a need for humidification which will more often occur in cold weather. The air leaving the incubator gives up a greater portion of its heat to the air entering the incubator by means of the heat exchanger 40 but this air may still be considerably above the temperature of the spray 567 and accordingly the spray 567 will be able to extract a large amount of heat from the outgoing air. This water which has now been warmed by the outgoing air flows by way of a pipe 576 into the coil 36 which is located in the chamber 35 and is provided for further preheating the air entering the incubator, the water leaving this coil by way of pipe 577 and passing into the chamber 488, thus forming an additional supply of water for the cooling tower 488. It will accordingly be seen that while the outgoing air gives up a large portion of its heat to the air entering the incubator by way of the heat exchanger 40, further heat is extracted from this air and given to the incoming air by means of the spray 567 and the preheating coil 36. In 0° F. weather, the water flowing to the spray 568 will be about 60° F. and the water flowing through pipe 576 to the coil 36 will be about 75° F.

The valve 570 which controls the flow of water to the spray 568 is controlled by the thermostat 580 which comprises a bulb 581 located in contact with the pipe 577, this bulb being connected by means of a capillary tube 582 with a bellows 583, this bellows controlling the position of a slider arm 585 which moves over a potentiometer resistance 586 in accordance with variations in the temperature of the water flowing through the pipe 577. The slider arm and potentiometer form a control means for the motor 590 which controls the position of the valve 570, this motor being a proportioning motor of the type described above so that the position of the valve 570 will vary in accordance with the temperature of the water leaving the coil 36. If the outside temperature is excessively low and a large amount of water must be added to this air for humidification purposes, it may be necessary to further raise the temperature of the air passing to the spray 540 so that when the temperature of the water leaving the coil 36 drops the valve 570 will begin to open permitting water to flow from the spray 568 to further raise the temperature of the air and increase the amount of moisture absorbed thereby.

Should the supply of water to the cooling tower 488 by way of the pipe 577 be insufficient, water may also be supplied thereto by way of the pipe 600 connected to a source of water by way of the pipe 542. A float valve 601 cooperates with the outlet of the pipe 600 to control the flow of water therethrough into the cooling tower in a manner to maintain the level of water therein at a predetermined value.

During periods when dehumidification of the air is required and cooling fluid is being circulated through the coil 510 to lower the dew-point of the air, moisture will collect on this coil and this moisture is drained therefrom by means of the pipe 605 which conducts this water into the sump in the bottom of the chamber 38.

If the temperature of the air entering the cooling tower 488 is excessively low, the air in chamber 41' leaving the outlet 42 may be conducted to the inlet 489 of the cooling tower 488 since this air will always be at a relatively high value such as 50° F.

Figure 3:
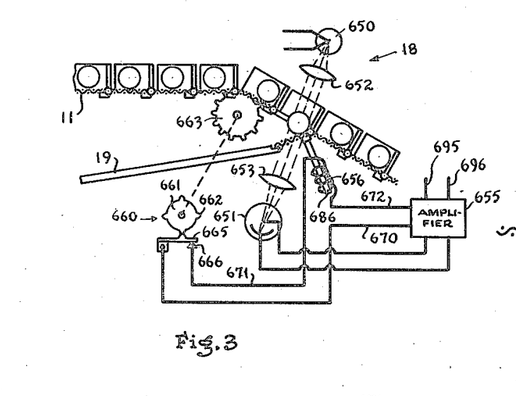
Figure 3 is a schematic view of the egg ejecting mechanism.
Figure 4:
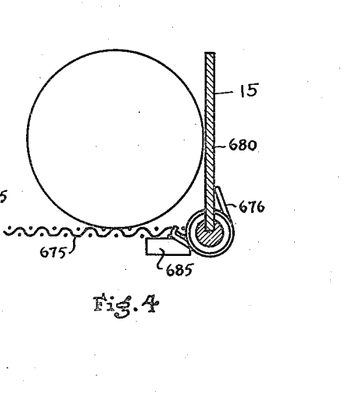
Figure 4 is a view in cross section of a portion of the egg carrying belt.

Referring now to Figure 3, the means for causing automatic ejection of sterile eggs at a predetermined time during their passage through the incubator will be explained. This egg ejecting means is preferably located at a point which the eggs will reach shortly after their third day in the incubator and this means includes an arrangement utilizing a photo-electric cell for determining the fertility of the eggs. Located above the incubator is a series of incandescent lights 650, there being one light for each row of egg compartments on the belt 11 although for purposes of illustration only one has been illustrated, and on the opposite side of the belt is a photo-electric cell 651. Lenses 652 and 653 are located on opposite sides of the belt and between the lights 650 and the photo-electric cells 651 to direct the rays of light from the light source to the photo-electric cell as shown by dotted lines in Figure 3. When light passes from the light source 653 to the photo-electric cell 651, current is supplied to the amplifier 655 in a manner well understood in the art and this amplifier supplies current to a solenoid 656 at such times, the supply of current to the solenoid also being under the control of a timer 660. This timer comprises a cam 661 carrying a plurality of projections 662 thereon, this cam being connected for rotation with a sprocket 663 over which the conveyor belt passes so that movement of the cam 661 is in timed relation with the movement of the conveyor belt. The cam 661 controls the position of a switch arm 665 which is biased upwardly, this switch arm cooperating with a fixed contact 666 so that whenever one of the projections 662 engages the switch arm 665, the switch arm will be moved into engagement with the contact 666. This switch arm is arranged to be moved into engagement with the contact 666 only when the eggs carried by the belt 11 are in a position to intercept the beam of light between the lamp 650 and the photo-electric cell 651. If the egg is fertile it will permit the passage of relatively little light therethrough after the third day of incubation because of the embryo chick therein. Should the egg be sterile, however, sufficient light will pass through the egg so that the photo-electric cell will cause the energization of the solenoid 656.

Figures 5, 6:
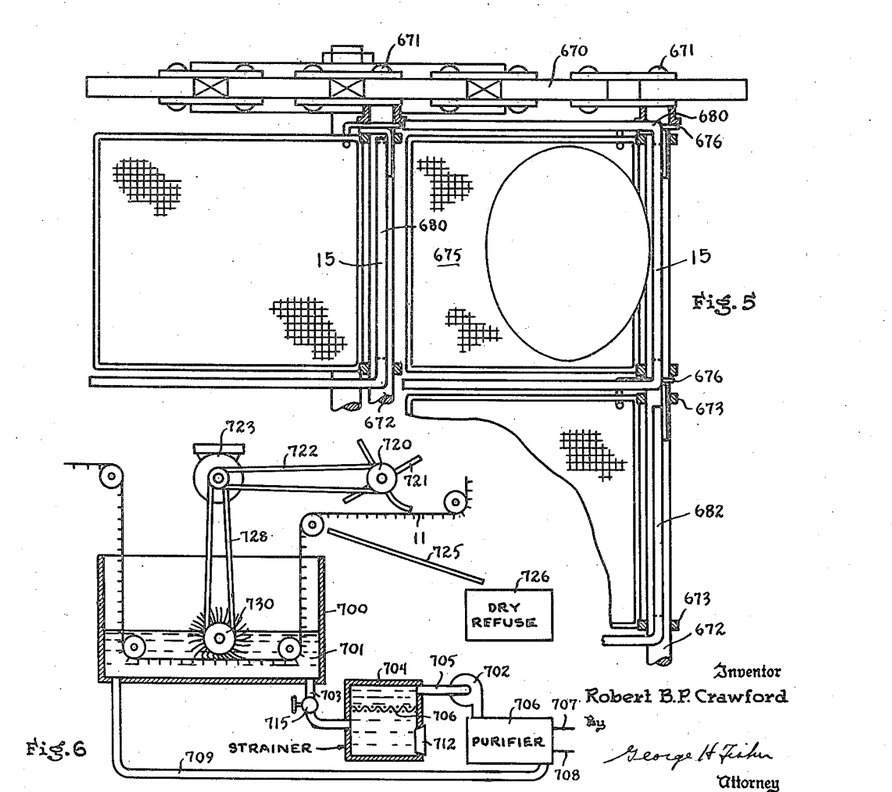
Figure 5 is a fragmentary top view with certain parts shown in cross section of the egg carrying belt.
Figure 6 is a cross sectional view of the cleaning means for the belt.

Referring now to Figure 5 wherein is illustrated a fragmentary portion of the conveyor belt, the conveyor belt comprises a pair of sprocket chains 670 on either side thereof, only one of such chains being shown. The sprocket chains comprise a plurality of interconnected links as is conventional and some of the pivots 671 for these links are extended as rods 672 so that the two sprocket chains are interconnected by means of a series of these rods. Rotatably carried by these rods as by means of the rings 673 are a plurality of egg carrying members 675 which may be made of any suitable porous light transmitting material such as a foraminous screen, these supporting members being biased upwardly by means of the springs 676 into the plane of the belt. The supporting members may be limited in their upward movement by engagement of the spring 676 with the wall member 680 described below, or in any other suitable manner. Suitably carried by the rods 672 are the partitions 15, shown in Figure 5 as the wall members 680, which together with the supporting members 675 form separate compartments on the conveyor belt which separate each egg on the belt from the other eggs thereon. The wall members at one edge of the belt may be U-shaped as shown in Figure 5 thus surrounding three sides of the egg and this U-shaped member cooperates with the next U-shaped member to form the fourth side of the compartment as clearly shown in Figure 5. The remaining compartments widthwise of the belt may be formed simply as L-shaped members 682, each L-shaped member cooperating with a similar member for another compartment to form the four upstanding walls of the compartment and in this manner each egg is separated from every other egg on the belt by these upstanding wall portions so that as air is circulated upwardly through the belt, no two eggs being carried thereby will be contacted by the same portion of air. These upstanding wall portions are carried by the rods 672 independently of the supporting screens 675 so that movement of these screens around the rods 672 as an axis against the force of the biasing springs 676 is permitted.

Each of the screen members 675 supporting the eggs has suitably supported adjacent its pivot and on the underside a member 685 which may be made of soft iron for example and will be attracted by the armature 686 of the electromagnet 656 when the magnet is energized. Upon energization of the magnet, the soft iron pieces 685 will be attracted to the armature 686 thus causing the screens 675 to pivot downwardly and permitting the eggs to roll out of the belt 11.

Supported below the belt is a guideway 19 suitably located so that when the supporting members 675 are pivoted downwardly under the influence of the electromagnet 656 the eggs will roll into this runway 19 and will roll out of the incubator where they may be gathered and disposed of as desired.

It will now be seen that at predetermined intervals the switch arm 665 will be moved into engagement with the contact 666, it being understood that there is a separate switch arm and contact similarly operated for each row of egg compartments on the belt and if the light from the light source 650 passes through the respective eggs on the belt, which will happen only if the eggs are sterile, current will flow through the respective amplifiers 655 through the electromagnet 656 by means of conductors 670, switch arms 665, contact 666, conductor 671, coil 656 and conductor 672 to the amplifier 655, power being supplied to the amplifier by means of line wires 695 and 696 connected to any suitable source of power (not shown). If this circuit were not interrupted periodically by the timer 660 the light would pass from the source 650 to the photoelectric cell 651 when that portion of the belt directly back of the egg were between the light source and the photo-electric cell since the egg compartments are made somewhat bigger than the eggs and this would cause downward movement of the floors of the compartments. It will thus be seen that whenever a sterile egg moves into the path of the light beam from the light source 650, the egg will be automatically ejected from the incubator so that no sterile eggs will move through the incubator after the third day, for example.

Attention is now directed to Figure 6 which shows one suitable form of belt cleaner and purifier through which the belt passes after leaving the incubator so that the portion of the belt entering the incubator is always maintained in a clean and pure condition. The belt passes from the exit end of the incubator into a tank 700 containing a supply of cleansing and sterilizing fluid 701, this fluid being continually changed by means of a pump 702. The fluid from the tank 700 flows through a pipe 703 into a receptacle 704 having its top portion in communication with the pump inlet by meanse of a pipe 705. A screen 706 is interposed between the pipe 703 and the pipe 705 to prevent any dirt particles from entering the pump 702. The pump discharges the fluid which has now been relieved of its dirt particles into a purifier 706 which may be of any suitable construction and may take the form of an ozone generator through which power is supplied by line wires 707 and 708 the fluid being completely purified in the purifier 706 and returning by means of the pipe 709 into the tank 700. This arrangement thus continuously changes the fluid in the tank 700, removing dirt therefrom and purifying it so that a completely sterilized cleaning fluid is continuously supplied to this tank. The receptacle 704 may be provided with a clean-out door 712 so that accumulated dirt on the screen 706 may be periodically removed, there being a shut-off valve 715 in the pipe 703 so that the flow of fluid into the receptacle 704 may be shut off at such time.

Located above a horizontal run of the belt 711 is a beater 720 of any suitable construction and may be provided with suitable flexible beating members 721 which may be formed of leather or other suitable material, the beater 720 being connected by means of the belt 722 to a motor 723 to cause rotation of the same. The beating elements 721 cause a continual beating action on the back of the belt 11 so that any loose foreign matter such as egg shells or the like will be removed and fall into a guide 725 whence they will pass into a suitable receptacle 726. In this manner the belt is removed of the majority of foreign matter prior to entering the cleaning receptacle 700. The motor 723 also drives by means of the belt 728 a brush 730 having suitable bristles for engaging the back of the belt 11 in the tank 700, thus imparting a scrubbing action to the belt and completely removing all remaining foreign matter therefrom and since the liquid within the receptacle 700 is continually cleansed and sterilized it will be apparent that the belt as it leaves the receptacle will be in a clean and purified condition.

To summarize briefly the operation of the system of Figures 1 and 2, it will be seen that a supply of fresh air is being continually circulated through the incubator although this supply may be relatively small, the air flowing upwardly over the heating or cooling coils, passing through the conveyor belt and passing outwardly from the incubator through the upper wall thereof, this circulation of air being effected by the fan 33. The walls of the incubator are kept at desired temperatures in the various stages and in this manner the eggs on the belt 11 will be maintained at desired temperatures which might be 100° F. in the first six stages of incubation and 98° F. in the last stage of incubation or the hatching stage. Since in some stages of incubation the eggs will require heat in order to maintain them at the proper temperature and since in the latter stages the eggs will be generating a large amount of heat, it will be necessary to remove some of this heat in these latter stages. The heat given up by the eggs in the latter stages of incubation is conducted to the first stages of incubation by means of the water circulating through the various coils imbedded in the walls of the incubator.

The pump 60 causes water to circulate through the desired coils, the flow of water to the pump being controlled by the valve 61, and this valve is operated to circulate a sufficient amount of water so that the water passing to the pump will be maintained at a desired temperature which temperature will be variable depending upon the number of eggs in the incubator and the temperature of the space in which the incubator is located. Thermostats in the various stages of the incubator control the supply of water to those stages in a manner to maintain the temperature therein at the proper values and when the incubator temperature rises sufficiently high, indicating a need for considerable cooling in the latter stages of incubation the cooling fluid is cooled by circulating this water in heat exchange relationship with the evaporator of a refrigeration system by closing the valve 241 in the by-pass to the coil 255. The water for heating the coils in the early stages of incubation is heated by passing through coils which are in heat exchange relationship with the condenser of the refrigeration system should heat be necessary in the early stages of incubation. Since the water transfers the heat from the incubator in the latter stages of incubation to the early stages of incubation, it will normally be unnecessary to further cool or heat the water to any considerable extent and it is therefore possible to utilize a refrigeration system of relatively small capacity for supplying the necessary heating and cooling to the various coils in the incubator.

The various heat exchangers by which the heat of the outgoing air is given up to the incoming air further increase the operating efficiency of the system and a large part of the available sensible and latent heat leaving the incubator is imparted to the air entering the same.

The cooling tower 488 operates to cool the condenser 133 during periods when the refrigeration system is being utilized to effect a larger amount of cooling than heating and in these instances the head pressure on the compressor will increase and the pressure controller 500 will operate the pump 495 to circulate cooling fluid through the cooling tower 488 and the cooling coil 480, the valves 260 and 261 being open at this time by the step controller 141 which causes these valves to open when sufficient cooling of the latter stages of the incubator is necessary.

The compressor 130 is controlled by the switch 151 of the step controller 141 in such a manner that when the temperature adjacent the outlet of the incubator is above 98° F., for example, the compressor operates to maintain a suction pressure of 60 lbs. for example. Between 95 and 98° F. the switch 151 will be in open circuit position and the compressor will be shut down. Should the temperature at the controller 139 drop to a still lower value such as 95°, the compressor will operate to maintain a lower suction pressure and at the same time heat will be supplied by the coil 195 to the evaporator 136 thus loading the compressor so that sufficient heat will be generated in the condenser 133 to produce the necessary heat for the early stages of incubation, it being understood these conditions will not occur under normal circumstances but only when there are relatively few or no eggs on the belt 11 in the latter stages of incubation.

During periods when dehumidification of the air passing to the incubator is necessary by reason of the humidity within the incubator rising too high, the humidity responsive device 525 causes pump 515 to circulate fluid from the cooling chamber 256 through the coil 510 to reduce the dew-point of the air entering the incubator. If on the other hand the humidity in the incubator falls too low, valves 541 and 560 are open, the spray 540 is operated and the tempering coil 552 is supplied with water to temper the air passing through the spray 540 whereby the temperature of the air will be raised and more water may be picked up thereby. The water from this spray 540 is utilized to absorb latent heat from the outgoing air in the chamber 41 and transform this latent heat into sensible heat of the incoming air passing through the chamber 35 by means of the coil 36. In excessively cold weather the water leaving the coil 36 may have a very low temperature and the spray 568 is at this time operated by the opening of the valve 570 to increase the humidity of the air passing into the incubator.

The eggs are automatically ejected by means of the egg ejector 18 at a predetermined time during their passage through the incubator if they are in a sterile condition so that they may be collected and used for a useful purpose such as the manufacture of egg powder before they have been in the incubator for too long a time. The cleaner 27 maintains the belt in a clean and sterilized condition thus materially reducing spread of germs to the eggs on the belt.

It will thus be seen that I have provided a system for controlling proper conditions of temperature and humidity in an incubator of relatively large capacity by the use of a relatively small refrigeration system for supplying whatever heating or cooling is necessary to the incubator and the employment of such a small system is made possible by a very efficient arrangement for utilizing the heat released by the eggs in the latter stages of incubation for heating the eggs in the earlier stages of incubation and under many conditions very little heat or cooling will be required by the refrigeration system since the heat given up by the eggs in the latter stages of incubation may be all that is necessary to properly heat the eggs in the earlier stages. Since the air which passes through the incubator flows upwardly through the belt 11 and since the eggs carried by the belt are all separated by partitions from one another, the air in the incubator is maintained in a condition of purity at all times and the circulation of air is unable to spread any germs that may be on or in one egg to another egg since there is no portion of the air that contacts more than a single egg. The employment of other means such as chemicals to reduce the germ concentration of air in the incubator is rendered unnecessary by this arrangement and since the use of such chemicals reduces the number of chicks that are hatched for a given number of eggs, the losses from unhatched eggs are considerably reduced and are also considerably reduced by reason of the fact that the temperature and humidity of the air in the incubator will be maintained at the desired value at all times.

Figure 7:
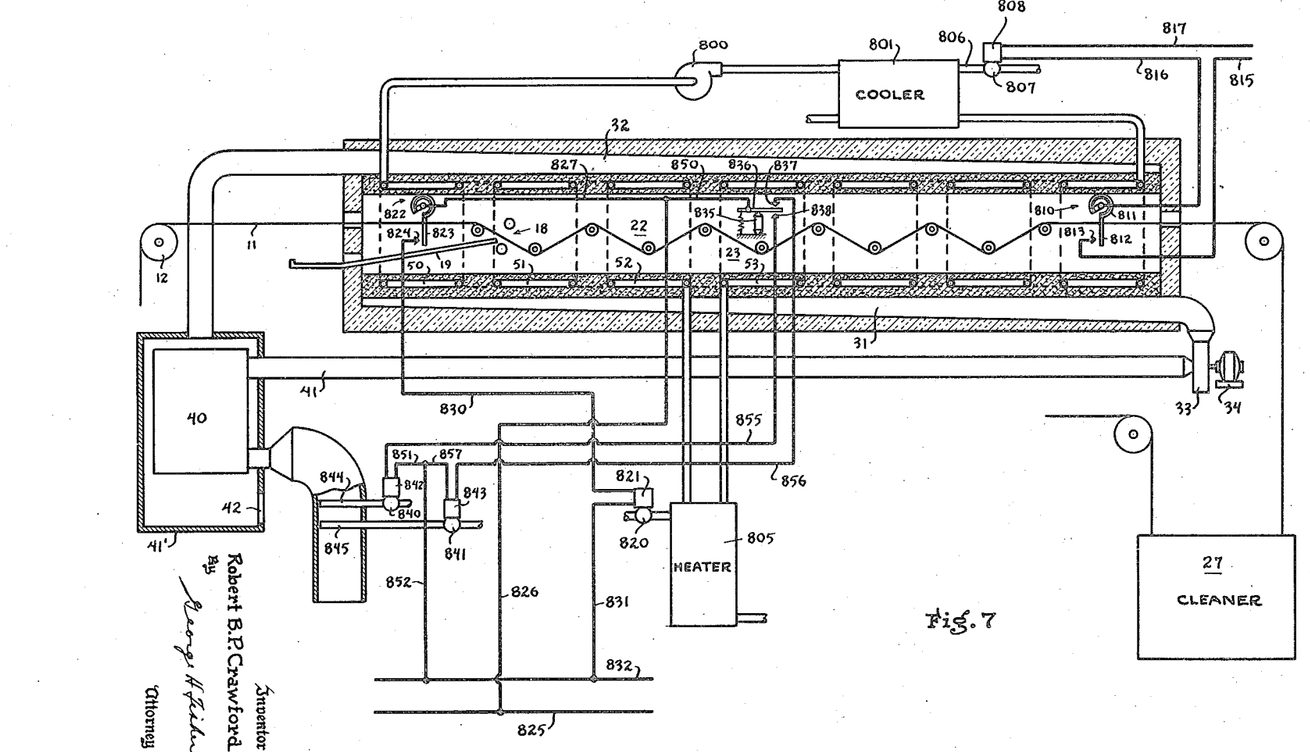
Figure 7 is a view with certain parts shown in cross section of a simplified form of conditioning system embodying the principles of my invention.

Referring now to Figure 7, I have illustrated a simplified form of air conditioning system which would be applicable for use with smaller incubators and which embodies the principles of the system illustrated in Figures 1 and 2.

In this figure there is no control whatever over the flow of water through the various coils in the different portions of the incubator but use is taken of the heat absorbed by the cooling fluid circulating through the coils in the latter stages of incubation for supplying the heat to the incubator in the earlier stages of incubation as in Figures 1 and 2. A pump 800 is provided for circulating the fluid through the various heat exchanger coils embedded in walls of the incubator, there being a cooler 801 located between the pump discharge and the coil in the last stage of the incubator whereby cooling of the heat exchanger medium may be effected if required. A heater is also provided between the coils 52 and 53 in stages 22 and 23 so that if insufficient heat is absorbed by the cooling medium in the latter stages of incubation to raise the temperature at the opposite end of the incubator to the required value, this may be done by the heater 805.

A cooling medium is supplied to the cooler 801 by means of a pipe 806 under the control of a valve 807 which may be operated by any suitable means such as a solenoid 808, the energization of which is controlled by a thermostat 810 which responds to the temperature adjacent the outlet end of the incubator. This thermostat may be of any suitable construction and for purposes of illustration is shown as including a bimetallic element 811 controlling the position of an arm 812 with respect to a fixed contact 813. When the temperature at the thermostat rises to an excessive value, the arm 812 moves into engagement with contact 813 and energizes the solenoid 808 by means of the following circuit: from line wire 815, contact 813, arm 812, bimetallic element 811, conductor 816, solenoid 808, and line wire 817. Thus whenever the temperature adjacent the outlet of the incubator becomes excessive, the valve 807 is opened, cooling medium is supplied to the cooler 801 whereby the heat exchanger medium being circulated therethrough by the pump 800 is cooled whereby additional heat may be absorbed from the incubator to reduce the temperature in the latter stages to the desired value.

Any suitable heating medium may be supplied to the heater 805 under control of a valve 820 the position of which may be controlled by a solenoid 821 which is under the control of a thermostat 822 located in the inlet end of the incubator, which is shown to be similar to the thermostat 810, the arrangement being such that when the temperature adjacent the inlet of the incubator drops to a predetermined value the thermostat 822 closes a circuit through the arm 823 and contact 824 thus energizing the solenoid 821 as follows: from line wire 825 through conductors 826, 827, thermostat 822, arm 823, contact 824, conductor 830, solenoid 821, and conductor 831 to the line wire 832. Accordingly, whenever the temperature adjacent the inlet of the incubator drops to a low value indicating that insufficient heat is being absorbed by the heat exchanger medium in the latter stages of incubation to raise the temperature in the early stages of incubation to the desired value, heating medium is supplied to the heater 805 so that sufficient heat will be radiated by the heating coils in the earlier stages of incubation to raise the temperature therein to the desired value. Under normal conditions however, if the incubator is properly insulated and is substantially full of eggs, sufficient heat may be absorbed by the heat exchanger medium in the latter stages of incubation and added to the incubator in the earlier stages of incubation to maintain temperature in all parts thereof at approximately the desired values. The temperature of the fluid being circulated will normally not fluctuate more than about two degrees throughout the cycle.

The heating and cooling requirements of each stage are considerably different from every other stage. For example, the first stage may take about 80% of the heat and the last stage may take about 70% of the cooling. The intermediate stages will require varying amounts of heating or cooling but very little of each. In order to carry the heat absorbed in the last stage to the first stage without losing it on the way, it is desirable in medium sized incubators to proportion the heat transfer surface in each stage to the load in the respective stage. Thus, the last or hatching stage may have about 70% of the surface in the total of the last three stages and the first stage may have about 80% of the surface in the total of the first three stages. With this arrangement, water, if used as the heat transfer fluid, may leave the last stage at about 102° F. and enter the first stage at about 101.5° F., as there is so little heat transfer between these stages, and the water may leave the first stage at about 96° F.

Located within the incubator at a suitable location such as adjacent the center portion thereof is a humidity responsive element 835 of any suitable construction and which controls the position of an arm 836 with respect to a pair of fixed contacts 837 and 838 in response to the humidity existing within the incubator. When the humidity in the incubator is excessive the arm 836 will engage the contact 837 and if the humidity drops to an undesirably low value the arm 836 will engage the contact 838. When the humidity is at the desired value however, the arm 836 will be between the contacts 837 and 838 and in engagement with neither contact. This humidity responsive device controls the operation of a pair of valves 840 and 841, the positions of which may be controlled by solenoids 842 and 843, respectively. The valve 840 may control the supply of a humidifying medium to the spray 844 whereas the valve 841 may control the supply of a dehumidifying medium to the spray 845. Both of these sprays are arranged in the path of fresh air entering the incubator, this air preferably passing through a heat exchanger 40 similar to that shown in Figure 1 for tempering the air prior to passing into the incubator.

If the humidity in the incubator is too low, arm 836 will engage contact 838 thus energizing solenoid 842 as follows: from the line wire 825 through conductors 826, 850, arm 836, contact 838, conductor 855, solenoid 840 and conductors 851 and 852 to the line wire 832. Energization of the solenoid causes opening of the valve 840 and supply of a suitable humidifying medium such as water to the spray 844 whereby the humidity of the air being supplied to the incubator is raised. If now the humidity of the air in the incubator becomes excessive, arm 836 will engage contact 837, energizing solenoid 843 as follows: from line wire 825 through conductors 826, 850, arm 836, contact 837, conductor 856, solenoid 843, and conductors 857 and 852 to the line wire 832. Upon energization of the solenoid 843, the valve 841 is opened and a suitable dehumidifying medium such as an hygroscopic brine is supplied to the spray 845 for reducing the humidity of the air being supplied to the incubator.

It will be apparent that while the system of Figure 7 is relatively simple and does not provide accurate control of temperature in each of the stages of the incubator nevertheless it does embody the principles of the system of Figures 1 and 2 and does provide control of the temperature adjacent the inlet and outlet of the incubator and of the humidity within the incubator and such a system may provide sufficiently good control for incubators of small capacity. This arrangement will also be suitable for incubators of large capacity but since it does not give as accurate control as the system of Figure 1, there may be a greater loss of chicks from fertile eggs than with a system of the type shown in Figure 1. The amount of control necessary will also vary somewhat in accordance with climatic conditions in the section of the country in which the incubator is to be used.

Any suitable dehumidifying medium may be employed in the spray 845 and this may take the form if desired of a solution of calcium chloride, which may also be utilized in the system of Figure 1 if desired. The unit 35 of Figure 1 may also be replaced if desired by a lump calcium dehumidifier for very humid climates.

Having described two preferred forms of my invention, it will be apparent that many modifications may be made by those skilled in the art and I therefore wish it to be understood that my invention is limited only by the scope of the appended claims.

I claim as my invention:

1. In an air conditioning system for an enclosure having certain portions thereof normally requiring cooling and other portions thereof normally requiring heating, means for absorbing heat from those portions of the enclosure normally requiring cooling, heat delivery means for those portions of the enclosure normally requiring heating, means for circulating a heat exchange medium through the heat absorbing and heat delivery means whereby heat is transferred from those portions requiring cooling to those portions requiring heating, a refrigerating apparatus, means utilizing the evaporator of said refrigerating apparatus for removing heat from the heat exchange medium passing through those portions of the enclosure requiring cooling, means utilizing the condenser of said refrigerating apparatus for adding heat to the heat exchange medium passing through those portions of the enclosure requiring heating, and means for artificially heating said evaporator when said enclosure requires more heating than cooling.

2. In an air conditioning system for an enclosure having certain portions thereof normally requiring cooling and other portions thereof normally requiring heating, means for absorbing heat from those portions of the enclosure normally requiring cooling, heat delivery means for those portions of the enclosure normally requiring heating, means for circulating a heat exchange medium through the heat absorbing and heat delivery means whereby heat is transferred from those portions requiring cooling to those portions requiring heating, a refrigerating apparatus, means utilizing the evaporator of said refrigerating apparatus for removing heat from the heat exchange medium passing through those portions of the enclosure requiring cooling, means utilizing the condenser of said refrigerating apparatus for adding heat to the heat exchange medium passing through those portions of the enclosure requiring heating, means for cooling the condenser of the refrigeration system, and means rendering said last means operative only when more cooling than heating is being done by the refrigeration system.

3. In an air conditioning system for an enclosure having certain portions thereof normally requiring cooling and other portions thereof normally requiring heating, means for absorbing heat from those portions of the enclosure normally requiring cooling, heat delivery means for those portions of the enclosure normally requiring heating, means for circulating a heat exchange medium through the heat absorbing and heat delivery means whereby heat is transferred from those portions requiring cooling to those portions requiring heating, a refrigerating apparatus, means utilizing the evaporator of said refrigerating apparatus for removing heat from the heat exchanger medium passing through those portions of the enclosure requiring cooling, means utilizing the condenser of said refrigerating apparatus for adding heat to the heat exchange medium passing through those portions of the enclosure requiring heating, means for cooling the condenser of the refrigeration system, means rendering said last means operative only when more cooling than heating is being done by the refrigeration system, and means utilizing the condenser cooling means for additionally cooling the heat exchange medium circulating through the heat absorbing means.

4. In an air conditioning system for an enclosure having portions requiring varying degrees of heating while other portions may simultaneously require varying degrees of cooling, heat exchanger coils associated with each of said portions of the enclosure, means for circulating a heat exchange medium serially through the several coils so that heat may be absorbed from the portions of the enclosure requiring cooling and transferred to the portions of the enclosure requiring heating, means responsive to the temperature in each portion of the enclosure for selectively controlling the flow of heat exchange medium through the respective portions or causing said medium to by-pass said portions, refrigerating apparatus including a condenser, and means responsive to a demand for heating in any of the portions of the enclosure for causing the heat exchange medium passing to said portion to pass in heat exchange relationship with the condenser.

5. In an air conditioning system for an enclosure having portions requiring varying degrees of heating while other portions may simultaneously require varying degrees of cooling, heat exchanger coils associated with each of said portions of the enclosure, means for circulating a heat exchange medium serially through the several coils so that heat may be absorbed from the portions of the enclosure requiring cooling and transferred to the portions of the enclosure requiring heating, means responsive to the temperature in each portion of the enclosure for selectively controlling the flow of heat exchange medium through the respective portions or causing said medium to by-pass said portions, refrigerating apparatus including a condenser and an evaporator, means responsive to a demand for heating in any of the portions of the enclosure for causing the heat exchange medium passing to said portion to pass in heat exchange relationship with said condenser, and means responsive to the attainment of a high predetermined temperature in a portion of the enclosure requiring cooling for causing the heat exchange medium passing to those portions of the enclosure requiring cooling to pass in heat exchange relationship with said evaporator.

6. In an air conditioning system for an enclosure having portions requiring varying degrees of heating while other portions may simultaneously require varying degrees of cooling, heat exchanger coils associated with each of said portions of the enclosure, means for circulating a heat exchange medium serially through the several coils so that heat may be absorbed from the portions of the enclosure requiring cooling and transferred to the portions of the enclosure requiring heating, means responsive to the temperature in each portion of the enclosure for selectively controlling the flow of heat exchange medium through the respective portions or causing said medium to by-pass said portions, refrigerating apparatus including a condenser and an evaporator, means responsive to a demand for heating in any of the portions of the enclosure for causing the heat exchange medium passing to said portion to pass in heat exchange relationship with said condenser, means responsive to the attainment of a high predetermined temperature in a portion of the enclosure requiring cooling for causing the heat exchange medium passing to those portions of the enclosure requiring cooling to pass in heat exchange relationship with said evaporator, and means utilizing said evaporator for reducing the humidity in the enclosure.

7. In an air conditioning system for an enclosure having certain portions thereof normally requiring cooling and certain other portions normally requiring heating, means for absorbing heat from those portions of the enclosure normally requiring cooling, heat delivery means for those portions of the enclosure normally requiring heating, means for circulating a heat exchange medium successively through the heat absorbing and heat delivery means whereby heat is transferred from those portions requiring cooling to those portions requiring heating, by-pass means for said heat exchange medium around each of said portions, means for cooling said fluid, means for heating said fluid, means responsive to the temperature of the portions normally requiring cooling for causing said heat exchange medium to flow through said cooling means and said heat absorbing means when cooling is required or to by-pass both of them when cooling is not required, and means responsive to the temperature of the portions normally requiring heating for causing said heat exchange medium to flow through said heating means and heat delivery means when heating is required and to by-pass both of them when heating is not required.

8. In an air conditioning system for an enclosure having certain portions thereof normally requiring cooling and certain other portions normally requiring heating, means for absorbing heat from those portions of the enclosure normally requiring cooling, heat delivery means for those portions of the enclosure normally requiring heating, means for circulating a heat exchange medium successively through the heat absorbing and heat delivery means whereby heat is transferred from those portions requiring cooling to those portions requiring heating, by-pass means for said heat exchange medium around each of said portions, refrigerating means having an evaporator and condenser, means responsive to the temperature of the portions normally requiring cooling for causing said heat exchange medium to flow into heat exchange relationship with said evaporator and then through said heat absorbing means when cooling is required or to by-pass both of them when cooling is not required, and means responsive to the temperature of the portions normally requiring heating for causing said heat exchange medium to flow into heat exchange relationship with said condenser and then through said heat delivery means when heating is required or to by-pass both of them when heating is not required.

9. In an air conditioning system for an enclosure having certain portions thereof normally requiring cooling and certain other portions normally requiring heating, means for absorbing heat from those portions of the enclosure normally requiring cooling, heat delivery means for those portions of the enclosure normally requiring heating, means for circulating a heat exchange medium successively through the heat absorbing and heat delivery means whereby heat is transferred from those portions requiring cooling to those portions requiring heating, by-pass means for said heat exchange medium around each of said portions, refrigerating means having an evaporator and condenser, means responsive to the temperature of the portions normally requiring cooling for causing said heat exchange medium to flow into heat exchange relationship with said evaporator and then through said heat absorbing means, when cooling is required or to by-pass both of them when cooling is not required, and means responsive to the temperature of the portions normally requiring heating for causing said heat exchange medium to flow into heat exchange relationship with said condenser and then through said heat delivery means when heating is required or to by-pass both of them when heating is not required, and additional means for cooling said condenser when more cooling is required than heating.

10. In an air conditioning system for an enclosure having certain portions thereof normally requiring cooling and certain other portions normally requiring heating, means for absorbing heat from those portions of the enclosure normally requiring cooling, heat delivery means for those portions of the enclosure normally requiring heating, means for circulating a heat exchange medium successively through the heat absorbing and heat delivery means whereby heat is transferred from those portions requiring cooling to those portions requiring heating, by-pass means for said heat exchange medium around each of said portions, refrigerating means having an evaporator and condenser, means responsive to the temperature of the portions normally requiring cooling for causing said heat exchange medium to flow into heat exchange relationship with said evaporator and then through said heat absorbing means when cooling is required or to by-pass both of them when cooling is not required, and means responsive to the temperature of the portions normally requiring heating for causing said heat exchange medium to flow into heat exchange relationship with said condenser and then through said heat delivery means when heating is required or to by-pass both of them when heating is not required, and additional means for heating said evaporator when more heating than cooling is required.

11. In an air conditioning system for an enclosure having certain portions thereof normally requiring cooling and certain other portions normally requiring heating, means for absorbing heat from those portions of the enclosure normally requiring cooling, heat delivery means for those portions of the enclosure normally requiring heating, means for circulating a heat exchange medium successively through the heat absorbing and heat delivery means whereby heat is transferred from those portions requiring cooling to those portions requiring heating, by-pass means for said heat exchange medium around each of said portions, means for cooling said fluid, means for heating said fluid, means responsive to the temperature of the portions normally requiring cooling for causing said heat exchange medium to flow through said cooling means and said heat absorbing means when cooling is required or to by-pass both of them when cooling is not required, and means responsive to the temperature of the portions normally requiring heating for causing said heat exchange medium to flow through said heating means and heat delivery means when heating is required and to by-pass both of them when heat is not required, and means for controlling the rate of flow of said heat exchange fluid in accordance with its temperature for maintaining said temperature at a predetermined value.

12. In an air conditioning system for an enclosure having certain portions thereof normally requiring cooling and certain other portions normally requiring heating, means for absorbing heat from those portions of the enclosure normally requiring cooling, heat delivery means for those portions of the enclosure normally requiring heating, means for circulating a heat exchange medium successively through the heat absorbing and heat delivery means whereby heat is transferred from those portions requiring cooling to those portions requiring heating, by-pass means for said heat exchange medium around each of said portions, means for cooling said fluid, means for heating said fluid, means responsive to the temperature of the portions normally requiring cooling for causing said heat exchange medium to flow through said cooling means and said heat absorbing means when cooling is required or to by-pass both of them when cooling is not required, and means responsive to the temperature of the portions normally requiring heating for causing said heat exchange medium to flow through said heating means and heat delivery means when heating is required and to by-pass both of them when heat is not required, means for controlling the rate of flow of said heat exchange fluid in accordance with its temperature for maintaining said temperature at a predetermined value, and means for varying said predetermined value in accordance with the load on the system.

ROBERT B. P. CRAWFORD.